United States Patent
Asahina et al.

(10) Patent No.: US 8,952,120 B2
(45) Date of Patent: *Feb. 10, 2015

(54) POLYISOCYANATE COMPOSITION AND COATING COMPOSITION CONTAINING THE SAME

(75) Inventors: Yoshiyuki Asahina, Tokyo (JP); Masakazu Yamauchi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/992,392

(22) PCT Filed: Sep. 21, 2006

(86) PCT No.: PCT/JP2006/318762
§ 371 (c)(1),
(2), (4) Date: Mar. 21, 2008

(87) PCT Pub. No.: WO2007/034883
PCT Pub. Date: Mar. 29, 2007

(65) Prior Publication Data
US 2009/0239998 A1    Sep. 24, 2009

(30) Foreign Application Priority Data

Sep. 22, 2005 (JP) ................. 2005-275664

(51) Int. Cl.
| | | |
|---|---|---|
| C08G 18/79 | (2006.01) | |
| C08G 18/73 | (2006.01) | |
| C07D 251/34 | (2006.01) | |
| C07C 275/60 | (2006.01) | |
| C07D 229/00 | (2006.01) | |

(52) U.S. Cl.
USPC .......... 528/73; 252/182.2; 540/202; 544/193; 544/222; 548/951; 548/952; 560/158; 560/330; 564/44; 564/45

(58) Field of Classification Search
USPC ................ 252/182.2; 540/202; 544/193, 222; 548/951, 952; 560/158, 330; 564/44, 564/45; 528/73
See application file for complete search history.

(56) References Cited

U.S. PATENT DOCUMENTS

| | | | |
|---|---|---|---|
| 4,324,879 A | | 4/1982 | Bock et al. |
| 4,801,663 A | * | 1/1989 | Ueyanagi et al. ............. 525/528 |
| 4,810,820 A | * | 3/1989 | Slack et al. .................. 560/27 |
| 5,124,427 A | | 6/1992 | Potter et al. |
| 5,208,334 A | * | 5/1993 | Potter et al. ................. 544/193 |
| 5,258,482 A | * | 11/1993 | Jacobs et al. ................. 528/49 |
| 5,789,519 A | * | 8/1998 | Slack et al. ................. 528/49 |
| 6,111,048 A | * | 8/2000 | Asahina et al. .............. 528/45 |
| 7,288,213 B1 | | 10/2007 | Charriere et al. |
| 2006/0223968 A1 | * | 10/2006 | Zielinski et al. ............. 528/44 |

FOREIGN PATENT DOCUMENTS

| | | |
|---|---|---|
| EP | 0 330 966 A2 | 2/1989 |
| EP | 0 496 208 | 7/1992 |
| EP | 1 484 350 A2 | 5/2004 |
| JP | 55-38380 | 3/1980 |
| JP | 61-151179 | 7/1986 |
| JP | 64-33115 | 2/1989 |
| JP | 64-54077 A | 3/1989 |
| JP | 4-306218 A | 10/1992 |
| JP | 05-70444 | 3/1993 |
| JP | 05-170748 | 7/1993 |
| JP | 5-222007 * | 8/1993 |
| JP | 5-287240 A | 11/1993 |
| JP | 06-41270 | 2/1994 |
| JP | 06-62913 | 8/1994 |
| JP | 07-330860 | 12/1995 |
| JP | 09-12660 | 1/1997 |
| JP | 2002-60459 | 2/2002 |
| WO | WO 99/55756 * | 11/1999 |

OTHER PUBLICATIONS

European Search Report in counterpart EP Application No. 06821806.4 dated Jul. 30, 2010.
Bayer MaterialScience Safety data sheet of Desmodur® N 3600 dated Feb. 7, 2005.
Corporate brochure Viscometer Model TV-22/33, Toki Sangyo Co. Ltd. (2004).
Mundstock, Holger et al., "New Low Viscous Polyisocyanates," Macromol. Symp. (2002)187, 281.
$^1$H and $^{13}$C NMR spectra of Desmodur® N 3600 dated Feb. 25, 2013.
Römpps Chemie Lexikon, Section "Viskosimeter" (2011).
Römpps Chemie Lexikon, Section "Viskosimetrie" (2011).
Website www.tokisangyo.com, retrieved Feb. 22, 2013.
Website www.tokyokeiki-usa.com, retrieved Feb. 21, 2013.
Notice of Opposition for EP Application No. 06621806.4 B1 dated Mar. 7, 2013.
Opposition against EP 1 930 358 B1 dated Feb. 25, 2013.

* cited by examiner

*Primary Examiner* — Rabon Sergent
(74) *Attorney, Agent, or Firm* — Finnegan, Henderson, Farabow, Garrett & Dunner, L.L.P.

(57) ABSTRACT

An isocyanurate type polyisocyanate composition which is derived from an aliphatic diisocyanate monomer and an alcohol and satisfies all of the following requirements when it contains substantially no aliphatic diisocyanate monomer and substantially no solvent: 1) the viscosity at 25° C. is 500-1,500 mPa·s; 2) the isocyanurate trimer concentration is 60-95 mass %; 3) when the number of allophanate bonds is expressed as A and the number of isocyanurate bonds is expressed as B, the proportion of the allophanate bonds, $a=(A/(A+B))\times 100$, is 1-30%; and 4) when the number of urethodione bonds is expressed as D, the proportion of the urethodione bonds, $d=(D/(B+D))\times 100$, is less than 2%.

5 Claims, No Drawings

POLYISOCYANATE COMPOSITION AND COATING COMPOSITION CONTAINING THE SAME

TECHNICAL FIELD

The present invention relates to a polyisocyanate composition which has a low viscosity and has good compatibility with low polarity solvents, and the present invention also relates to a coating composition which has good coating physical properties such as weather-resistance.

BACKGROUND ART

An urethane coating compositions which have polyisocyanate as the hardening agent have excellent chemical resistance and good flexibility and the like and are widely used as a coating material for cars, building interiors and exteriors, household appliances, and the like. Furthermore, since coatings obtained from polyisocyanates which are derived from aliphatic diisocyanates have excellent coating physical properties such as non-yellowing and weather-resistance, they are widely used.

In particular, isocyanurate type polyisocyanates which contain an isocyanurate group are known to have excellent coating physical properties such as weather-resistance (Patent document 1).

Furthermore, with the isocyanurate type polyisocyanate disclosed in Patent document 2, compared to the prior art, the cross-linking performance and the drying performance of the coating are equivalent, and in addition, it has an excellent low viscosity, compatibility with polyol, and solubility in low polarity solvents. However, further solubility in low polarity solvents has been sought.

In addition, isocyanurate type polyisocyanates are more stable than polyisocyanates having other structures. During storage, there is only slight increase in diisocyanate monomer concentration, but further suppression of the increase of the concentration has been sought.

With polyisocyanate mixtures disclosed in Patent document 3, in which a monoisocyanurate group and a monoallophanate group are present in a prescribed mol ratio, the mixtures have even lower viscosity, excellent compatibility with polyol and solubility in low polarity solvents. However, the increase of the allophanate group has in some cases reduced the cross-linking of polyisocyanate, and reduced the drying performance as well as the weather-resistance of the coating.

Patent Document 1: JP-A-55-38380
Patent Document 2: JP-B-6-62913
Patent Document 3: JP-A-5-70444
Patent Document 4: JP-A-61-151179

DISCLOSURE OF THE INVENTION

An object of the present invention is to provide a polyisocyanate composition which has a low viscosity and which has good solubility in a low polarity solvent, and in which an increase of diisocyanate monomer concentration during storage is suppressed, and when used as a hardening agent for coating, favorable coating physical properties in drying performance, weather-resistance, and the like are achieved.

As a result of intensive study, the present inventors have discovered that the previously described object can be achieved by a prescribed polyisocyanate composition having an isocyanurate group, and the present invention was achieved.

In other words, the present invention is as follows.

1. An isocyanurate type polyisocyanate composition comprising an aliphatic diisocyanate monomer and an alcohol and satisfies all of the following requirements when the composition contains substantially no aliphatic diisocyanate monomer and substantially no solvent:

1) a viscosity at 25° C. is 500 to 1500 mPa·s,
   2) the concentration of isocyanurate trimer is from 60 to 95 mass %,
   3) an allophanate bond number ratio, $a=(A/(A+B))\times 100$, is 1-30%, wherein A is an allophanate bond number, and B is an isocyanurate bond number, and
   4) a urethodione bond number ratio, $d=(D/(B+D))\times 100$, is less than 2%, wherein D is a urethodione bond number.

2. The polyisocyanate composition according to the above 1, wherein said allophanate bond number ratio a is 1-10%.

3. The polyisocyanate composition according to the above 1 or 2, wherein said aliphatic diisocyanate monomer is hexamethylene diisocyanate.

4. The polyisocyanate composition according to the above 1, 2 or 3, wherein said alcohol is a monoalcohol.

5. The polyisocyanate composition according to the above 1, 2, 3 or 4, obtained by using an ammonium compound as an isocyanurate forming reaction catalyst in an isocyanurate forming reaction of said aliphatic diisocyanate monomer.

6. A coating composition comprising the polyisocyanate composition according to the above 1, 2, 3, 4 or 5.

BEST MODE FOR CARRYING OUT THE INVENTION

Below, the present invention will be described in detail.

The diisocyanate monomer used in the present invention is an aliphatic diisocyanate monomer. For the aliphatic diisocyanate monomer, one having 4-30 carbon atoms is preferred, and examples include tetramethylene-1,4-diisocyanate, pentamethylene-1,5-diisocyanate, hexamethylene diisocyanate (henceforth referred to as HDI), 2,2,4-trimethyl-hexamethylene-1,6-diisocyanate, lysine diisocyanate. These can be used singly or two or more types can be used in combination. Among these, from the viewpoint of commercial availability, HDI is preferable.

In addition, as needed, other diisocyanates such as isophorone diisocyanate can be used in conjunction.

For the alcohol used in the present invention, compounds comprising only carbon, oxygen, and hydrogen elements are preferable, and the examples of the compounds include monoalcohols and dialcohols.

For the monoalcohols, preferably this is a straight chain or branched alcohol, or alicyclic alcohol of a carbon number 1-9, for example, methanol, ethanol, n-propanol, isopropanol, n-butanol, isobutanol, sec-butanol, n-pentanol, n-hexanol, n-octanol, n-nonanol, 2-ethyl butanol, 2,2-dimethyl hexanol, 2-ethyl hexanol, cyclohexanol, methyl cyclohexanol, and ethyl cyclohexanol. These can be used singly or two or more can be used in combination.

The dialcohols, for example, include 1,3-butane diol, neopentyl glycol, and 2-ethyl hexane diol.

Preferably, this is a monoalcohol having 4 to 9 carbon atoms. The use of the monoalcohol is effective in lowering the viscosity of the resulting isocyanurate type polyisocyanate composition.

When the polyisocyanate composition of the present invention which, as described previously, is derived from an aliphatic diisocyanate monomer and an alcohol, is in a state where the aliphatic diisocyanate monomer and a solvent are not substantially contained, the composition has a viscosity at 25° C. of 500 to 1500 mPa·s, and preferably 650 to 1500 mPa·s, and more preferably 800 to 1500 mPa·s.

When the viscosity is less than 500 mPa·s, the yield of the polyisocyanate composition is dramatically low, and the allophanate bond number ratio becomes high, and physical properties such as drying performance can become poor. When the viscosity exceeds 1500 mPa·s, creating a high solid coating can become difficult.

As used herein, a state where the aliphatic diisocyanate monomer and a solvent are not substantially contained means that the total concentration thereof is 1 mass % or less.

The isocyanurate trimer contained in the polyisocyanate composition of the present invention is a compound composed of 3 molecules of diisocyanate monomers and having isocyanurate bonds represented by the following formula (1). The concentration thereof is 60 to 95 mass %, and preferably 63 to 75 mass %, and further preferably 66 to 75 mass %.

[Formula 1]

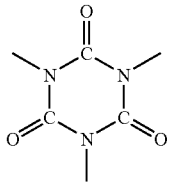

When the concentration of the isocyanurate trimer is less than 60 mass %, the viscosity of the polyisocyanate composition may become high, and when the concentration exceeds 95 mass %, the yield is dramatically lowered, and this is not preferred.

The allophanate bonding number ratio a in the polyisocyanate composition of the present invention is defined as follows, with A being an allophanate bond number and B being an isocyanurate bond number, $a=(A/(A+B))\times 100$ The a is 1-30%, and preferably 1 to 20%, and further preferably 1 to 10%, and most preferably, 1 to 4%. The allophanate bond is derived from the hydroxyl group of the alcohol which is one of the raw materials for the polyisocyanate composition of the present invention, and the isocyanate group. When the allophanate bond ratio a is less than 1%, there can be reduced compatibility with low polarity solvents. When the ratio exceeds 30%, there can be a deterioration in coating physical properties such as drying performance and weather-resistance. By the presence of the allophanate bonds, it was surprising that the increase in diisocyanate monomer concentration was suppressed even when the polyisocyanate composition was stored for a long time.

Surprisingly, by the presence of the allophanate bonds, even when the polyisocyanate composition was stored for a long period of time, the increase in the diisocyanate monomer concentration was suppressed.

The urethodione bond number ratio d of the polyisocyanate composition of the present invention is defined as the following, with D being a urethodione bond number, $d=(D/(B+D))\times 100$ The d is less than 2%. When the concentration is within this range, a good thermal stability can be obtained.

The urethane bond number ratio c in the polyisocyanate composition of the present invention is defined as the following, with C being a urethane bond number.

$c=(C/(B+C))\times 100$

The c is 0.5% or less. When c exceeds 0.5% and further a monoalcohol is used for the raw material, a compound with an isocyanate group number of 1 is present, and the drying performance and the like of the coating can be reduced.

The HDI monomer mass concentration in the polyisocyanate composition of the present invention is 3 mass % or less, and preferably 1 mass % or less, and further preferably 0.5 mass % or less. When the HDI monomer concentration exceeds 3 mass %, the hardening performance of the polyisocyanate composition can be decreased.

The average isocyanate group number in the polyisocyanate composition of the present invention is 2.8 to 3.3. When the average isocyanate group number is less than 2.8, the drying performance of the coating can become poor. When it exceeds 3.3, the viscosity of the polyisocyanate composition can increase, which is not preferred. The isocyanate group concentration is 22 to 25 mass %. When the isocyanate group concentration is less than 22 mass %, this can result in poor drying performance of the coating. When the concentration exceeds 25 mass %, the diisocyanate monomer concentration becomes high as a result, which is not preferred.

A method for manufacturing the polyisocyanate composition of the present invention is described in detail below.

As raw materials for the polyisocyanate composition of the present invention, at least an aliphatic diisocyanate monomer and an alcohol are used. In this case, the mass % of the alcohol with respect to the total mass is 0.02 to 0.7%, preferably 0.05 to 0.4%, and further preferably 0.03 to 0.2%. The alcohol can be added at the same time as the aliphatic diisocyanate monomer, or as described later, it can be added at the same time as an isocyanurate forming reaction catalyst. The isocyanurate forming reaction catalyst diluted with the alcohol can be added. When the aliphatic diisocyanate monomer and the alcohol are prepared before adding the isocyanurate forming reaction catalyst, the isocyanate group of the aliphatic diisocyanate monomer and the hydroxyl group of the alcohol can be reacted under conditions of 60 to 100° C. and 0.5 to 3 hours.

Afterwards, the isocyanurate forming reaction catalyst is added, and an isocyanurate forming reaction is implemented. By this isocyanurate forming reaction, isocyanurate trimer is generated, and the urethane bonds which is present is converted to an allophanate bonds. When the alcohol is added at the same time as the isocyanurate forming reaction catalyst, the hydroxyl group of the alcohol reacts with the isocyanate group of the aliphatic diisocyanate, and in the end, the allophanate bonds are formed. For the isocyanurate forming reaction catalyst, in general, a compound that is basic is used. The concrete examples of the isocyanurate forming reaction catalyst include 1) for example, hydroxide of tetraalkylammonium, such as tetramethylammonium and tetraethylammonium, or salts of organic weak acids such as acetic acid and capric acid;

2) for example, hydroxide of hydroxyalkylammonium such as trimethyl hydroxypropyl ammonium, trimethyl hydroxyethyl ammonium, triethyl hydroxypropyl ammonium, and triethyl hydroxyethyl ammonium, or salts of organic weak acids such as acetic acid and capric acid;

3) metal salts of alkyl carboxylic acids such as acetic acid, caproic acid, octyl acid, and myristic acid, with tin, zinc, lead, sodium, potassium, and the like;

4) for example, metal alcoholates of sodium, potassium, and the like;

5) for example, aminosilyl group containing compounds such as hexamethyldisilazane;

6) manich bases; and 7) combined use of tertiary amines and epoxy compounds.

The above 1), 2), or 3) are preferable. An aminosilyl group containing compound is not preferred because, depending on the usage conditions, there are side reactions such as urethodione generation. For the catalyst, one that can suppress the formation of urethodione must be selected. Among these, a tetraalkyl ammonium compound is preferable, and more preferable is the organic weak acid salt of tetraalkyl ammonium. Quaternary ammonium compounds are very active with respect to the isocyanurate forming reaction, and furthermore the organic weak acid salt thereof has stability in the activity, and also urethodione bonds are not readily generated, and therefore this is preferred. The additive amount of the isocyanurate forming reaction catalyst with respect to the mass of the prepared aliphatic diisocyanate is selected from 10 ppm to 500 ppm of a mass ratio. The temperature of isocyanurate forming reaction is 40 to 120° C., preferably 50 to 100° C., and the time of isocyanurate forming reaction is approximately 1 to 5 hours.

Once the isocyanurate forming reaction reaches a set value, the isocyanurate forming reaction is stopped. For stopping the isocyanurate forming reaction, the isocyanurate forming reaction catalyst is inactivated by, for example, neutralizing with an acidic compound such as phosphoric acid and acidic phosphate, thermolysis, or chemical degradation to stop the isocyanurate forming reaction. In order to obtain the polyisocyanate of the present invention, it is necessary to stop the progression of the reaction at the initial stage. However, with the formation of the ring trimerization of the isocyanate group, it becomes extremely difficult to stop the progression of the reaction at the initial stage because the reaction speed of the initial stage is extremely rapid, and thus the reaction conditions, in particular, the additive amount of the catalyst and the method for adding catalyst must be selected carefully. For example, it is suitable and recommended that the catalyst be divided and added every set period of time. Therefore, the yield of the polyisocyanate composition of the present invention is selected from a range between 10 and 30 mass %.

After stopping the reaction, filtration is conducted as needed, and the inactivated isocyanurate forming reaction catalyst is removed.

Since the reaction solution contains un-reacted aliphatic diisocyanate monomers, they are removed through thin film evaporation, extraction, and the like.

The isocyanate group of the polyisocyanate composition of the present invention is blocked by a blocking agent to obtain a blocked polyisocyanate. For the blocking agent that can be used, the following examples are given. The blocking agent that can be used in the present invention is a compound having one active hydrogen in a molecule, for example alcohols, alkyl phenols, phenols, active methylenes, mercaptans, acid amides, acid imides, imidazoles, ureas, oximes, amines, imides, pyrazole compounds, and the like. Concrete examples of the blocking agent are shown below.

(1) alcohols, such as methanol, ethanol, 2-propanol, n-butanol, sec-butanol, 2-ethyl-1-hexanol, 2-methoxyethanol, 2-ethoxyethanol, and 2-butoxyethanol;

(2) alkyl phenols: mono- and dialkyl phenols having an alkyl group with a carbon atom number of 4 or more as a substitution group, for example, monoalkyl phenols such as n-propyl phenol, isopropyl phenol, n-butyl phenol, sec-butyl phenol, t-butyl phenol, n-hexyl phenol, 2-ethyl hexyl phenol, n-octyl phenol, and n-nonyl phenol, and dialkyl phenols such as di-n-propyl phenol, diisopropyl phenol, isopropyl cresol, di-n-butyl phenol, di-t-butyl phenol, di-sec-butyl phenol, di-n-octyl phenol, di-2-ethyl hexyl phenol, and di-n-nonyl phenol;

(3) phenols: phenol, cresol, ethyl phenol, styrenated phenol, hydroxybenzoates, and the like;

(4) active methylenes: dimethyl malonate, diethyl malonate, methyl acetoacetate, ethyl acetoacetate, acetyl acetone, and the like;

(5) mercaptans: butyl mercaptan, dodecyl mercaptan, and the like;

(6) acid amides: acetoanilide, acetamide, $\epsilon$-caprolactam, $\delta$-valerolactam, $\gamma$-butyrolactam, and the like;

(7) acid imides: succinimide, maleinimide, and the like;

(8) imidazoles: imidazole, 2-methyl imidazole, and the like;

(9) ureas: urea, thiourea, ethylene urea, and the like;

(10) oximes: formaldoxime, acetaldoxime, acetoxime, methyl ethyl ketoxime, cyclohexanone oxime, and the like;

(11) amines: diphenyl amine, aniline, carbazole, di-n-propylamine, diisopropylamine, isopropyl ethylamine, and the like;

(12) imines: ethylene imine, polyethylene imine, and the like;

(13) pyrazoles: pyrazole, 3-methylpyrazole, 3,5-dimethylpyrazole, and the like.

The preferred blocking agent is at least one selected from the group consisting of alcohols, oximes, acid amides, active methylenes, and pyrazoles. Two or more can be used in combination.

The coating composition of the present invention is, as main components, composed of a compound having in a molecular two or more active hydrogens which are reactive to the isocyanate group, in addition to the polyisocyanate composition described previously. The isocyanate group in the polyisocyanate composition reacts with the active hydrogen in the active hydrogen containing compound, resulting in formation of a cross-linked coating. The compound which contains two or more active hydrogens as described above is, for example, polyol, polyamine, polythiol, and the like, and in many cases, polyol is used. Examples of the polyol include polyester polyol, polyether polyol, acrylic polyol, polyolefin polyol, and fluoropolyol.

The polyester polyol, for example, includes polyester polyols obtained by a condensation reaction of single or a mixture of dibasic acids selected from the group of carboxylic acid such as succinic acid, adipic acid, sebacic acid, dimer acid, maleic anhydride, phthalic anhydride, isophthalic acid, terephthalic acid, and a single or a mixture of polyhydric alcohols selected from the group of ethylene glycol, propylene glycol, diethylene glycol, neopentyl glycol, trimethylolpropane, glycerin, and the like; and polycaprolactone, obtained by ring-opening polymerization using $\epsilon$-caprolactone and polyhydric alcohol. These polyester polyols can be modified by aromatic diisocyanates, aliphatic, and alicyclic diisocyanates, and polyisocyanates obtained from these. In this case, in particular, from the standpoint of weather-resistance and yellowing resistance, aliphatic and alicyclic diisocyanates and polyisocyanates obtained from these are preferred.

The polyether polyol, for example, includes polyether polyols which are obtained by random or block addition of a single or a mixture of alkylene oxides, such as ethylene oxide, propylene oxide, butylene oxide, cyclohexene oxide, and styrene oxide, onto a single or a mixture of multivalent hydroxy compounds, with using a strong basic catalyst such as hydroxides of lithium, sodium, potassium, and the like, alcoholate, alkyl amine, and a complex metal cyanide compound complex, such as metal porphyrin and zinc hexacyanocobaltate complex; polyether polyols obtained by reacting an alkylene oxide with a polyamine compound ethylene diamine and the like; and so-called polymer polyols obtained by polymerizing acrylamide and the like, using these polyethers as the medium.

The multivalent hydroxy compound, for example, includes:

diglycerin, ditrimethylol propane, pentaeryrthritol, dipentaerythritol, and the like;

sugar alcohol compounds such as erythritol, D-threitol, L-arabinitol, ribitol, xylitol, sorbitol, mannitol, galactitol, and rhamnitol;

monosaccharides such as arabinose, ribose, xylose, glucose, mannose, galactose, fructose, sorbose, rhamnose, fucose, and ribodesose;

disaccharides, such as trehalose, sucrose, maltose, cellobiose, gentiobiose, lactose, and melibiose;

trisaccharides such as raffinose, gentianose, and melezitose;

tetrasaccharides such as stachyose.

The acryl polyol includes acryl polyols obtained by polymerization, requiring at least one or more polymeric monomer containing a hydroxyl group and, if necessary, one or more of other polymeric monomers, selected from polymeric monomers, including acrylic esters having a hydroxyl group such as 2-hydroxyethyl acrylate, 2-hydroxypropyl acrylate, 2-hydroxybutyl acrylate, acrylic monoester or methacrylic acid monoester of glycerin, and acrylic monoester or methacrylic monoester of trimethylol propane; acrylic esters which do not have a hydroxyl group, such as methyl acrylate, ethyl acrylate, isopropyl acrylate, n-butyl acrylate, and 2-ethylhexyl acrylate; methacrylic esters having a hydroxyl group such as 2-hydroxyethyl methacrylate, 2-hydroxypropyl methacrylate, 2-hydroxybutyl methacrylate, 3-hydroxypropyl methacrylate, and 4-hydroxybutyl methacrylate; methacrylic esters which do not contain a hydroxyl group, such as methyl methacrylate, ethyl methacrylate, isopropyl methacrylate, n-butyl methacrylate, isobutyl methacrylate, n-hexyl methacrylate, and lauryl methacrylate; unsaturated carboxylic acids of acrylic acid, methacrylic acid, maleic acid, itaconic acid, and the like; unsaturated amides such as acrylamide, N-methylol acrylamide, and diacetone acrylamide; and other polymeric monomers such as glycidyl methacrylate, styrene, vinyl toluene, vinyl acetate, acrylonitrile, and dibutyl fumarate.

The polyolefinpolyol includes, for example, polybutadiene, hydrogenated polybutadiene polyisoprene and hydrogenated polyisoprene.

The fluorinated polyol is a polyol containing fluorine in the molecule thereof, which includes, for example, copolymers such as fluoroolefin, cyclovinyl ether, hydroxyalkylvinyl ether, monocarboxylic acid vinyl ester disclosed in JP-A-57-34107 and JP-A-61-275311. The hydroxyl value of the aforementioned polyol is selected from 30-200 mg KOH/g, and the acid value is selected from 0-30 mg KOH/g.

The preferred polyol is acrylpolyol and polyesterpolyol. Melamine hardening agents such as a complete alkyl type melamine, methylol type alkylated melamine and imino type alkylated melamine can be added, as necessary, to the coating composition of the present invention.

Also, various solvents and additives can be used according to usages and purposes. Solvents can be selected and used appropriately according to the usage and purpose from the group consisting of, for example, ketones such as acetone, methylethyl ketone and methylisobutyl ketone, esters such as ethyl acetate, n-butyl acetate and cellosolve acetate, alcohols such as butanol and isopropyl alcohol. These solvents may be used alone or in combination of two or more.

Further, antioxidants such as hindered phenol, UV absorbing agents such as benzotriazole and benzophenone, pigments such as titanium oxide, carbon black, indigo, quinacridon and pearl mica, metal powder pigments such as aluminum, and rheology control agents such as hydroxyethylcellulose, urea compounds and microgel may be added as necessary.

The coating compositions prepared in this way are useful as a primer or brown/skim coat to metals such as steel plates and surface treated steel plates, plastics and inorganic materials and useful for adding beauty, weather resistance, acid resistance, rust resistance, chipping resistance to pre-coat metals including rust resistant steel plates and to automobile painting. They are also useful as a urethane material for an adhesive, tackiness agent, elastomer, foam, surface treating agent and the like.

The present invention will be described as follows in more detail based on Examples, but the present invention is not limited by the following Examples.

(Viscosity Measurement)

Viscosity was measured using an E type viscometer (Tokimec Co., VISCONIC ED (Commercial Name)) at 25° C.

(Measurement for Isocyanurate Trimer)

Measurement for isocyanurate trimer was performed by a gel permeation chromatograph using an apparatus described below and a peak of a molecular weight equivalent to that of the trimer was defined as the trimer.

Apparatus: Tosoh Co., Ltd., Tosoh HLC-8020 (Commercial Name)

Column: Tosoh Co., Ltd., TSK gel Super (Commercial Name) H1000×1

TSK gel Super (Commercial Name) H2000×1

TSK gel Super (Commercial Name) H3000×1

Carrier: Tetrahydrofuran

Detection method: differential refractive index detector (Quantitation of Allophanate Bond Number A, Isocyanate Bond Number B, Urethane Bond Number C and Urethodione Bond Number D)

These values were quantitated by $^1$H-NMR and $^{13}$C-NMR measurement using JNM-LA400 (Commercial Name) manufactured by JEOL Inc.

(Concentration of Diisocyanate Monomer After Storing Polyisocyanate Composition)

A polyisocyanate composition was stored in a closed container at 50° C. for one month under a nitrogen atmosphere and then a diisocyanate monomer was measured by gas chromatography under the condition described below.

When the difference was less than 0.2 mass %, from 0.2 to less than 0.4 mass % or over 0.4 mass %, it was defined to be ○ (good), ∆ (fair) or x (not good), respectively.

Apparatus: Gas Chromatography GC-8A of Shimadzu Co.

Column: Silicone OV-17 (Commercial Name) of Shinwa Chemical Industries Co.

Carrier: Nitrogen 40-60 ml/min.

(Evaluation of Solubility in Low Polarity Solvents)

A polyisocyanate composition is dissolved in toluene to prepare a 10% solution. E g of the toluene solution is placed in a beaker, and n-hexane is instilled to it while stirring and the amount of added n-hexane is F g when the solution becomes turbid. When an F/E value is 0.8 or over or less than 0.8, it is defined to be ○ (good) or x (not good), respectively. The results are shown in Table 2.

(Evaluation of Drying Performance of Coating)

A polyisocyanate composition and polyesterpolyol (Setal 166, Commercial Name of the product of Nuplex Resin Inc.) were mixed so that the equivalent ratio of isocyanate group/ hydroxy group was 1.0, and to this mixture, a mixture of ethyl acetate/toluene/butyl acetate/xylene/propyleneglycol monomethyl ether acetate (mass ratio 30/30/20/15/5) was added as a thinner so that the total solid mass of polyisocyanate and polyesterpolyol to the resulting mixture was 50%, and then a coating solution was obtained. The coating solution was applied to a glass plate by an applicator so that the film thickness after drying was 40 μm and it was maintained in a condition of 20° C. and 63% humidity for 24 hours. Then, the coating film drying performance test was performed by touching with a finger. A coating with no tack was defined to be ○ (good) and a coating with a tack was defined to be x (not good). The results are shown in Table 2.

Examples 1-3

The air in a 4 neck flask equipped with a stirrer, a thermometer and a condenser was replaced with nitrogen, and 1000 g of HDI was added to the flask and while stirring at 60° C., 0.1 g of tetramethylammonium capriate as a catalyst and a monoalcohol was added at the same time under the conditions indicated in Table 1. Four hours later, the end of the reaction set by the refractive index measurement of the reaction mixture was checked and the reaction was terminated by adding 0.2 g of phosphoric acid. After filtering the reaction mixture, an unreacted HDI monomer was removed with a thin film evaporation apparatus.

Table 1 shows the type, quantity and yield of each monoalcohol used, a viscosity of each polyisocyanate composition thus obtained, a concentration of isocyanurate trimer, an allophanate bond number ratio a, a urethane bond number ratio c and a urethodione bond number ratio d.

Example 4

The air in a 4 neck flask equipped with a stirrer, a thermometer and condenser was replaced with nitrogen, and 1000 g of HDI and a monoalcohol was added to the flask at the same time and while stirring at 60° C., 0.1 g of tetramethylammonium capriate was added as a catalyst. Four hours later, the end of the reaction set by the refractive index measurement of the reaction mixture was checked and the reaction was terminated by adding 0.2 g of phosphoric acid.

After filtering the reaction mixture, an unreacted HDI monomer was removed with a thin film evaporation apparatus. Table 1 shows the type, quantity and yield of the monoalcohol used, a viscosity of the polyisocyanate composition thus obtained, a concentration of isocyanurate trimer, an allophanate bond number ratio a, a urethane bond number ratio c and a urethodione bond number ratio d.

Comparative Example 1

The air in a 4 neck flask equipped with a stirrer, a thermometer and a condenser was replaced with nitrogen, and 1000 g of HDI was added to the flask and while stirring at 60° C., 0.1 g of tetramethylammonium capriate was added as a catalyst. Four hours later, the end of the reaction set by the refractive index measurement of the reaction mixture was checked and the reaction was terminated by adding 0.2 g of phosphoric acid.

After filtering the reaction mixture, an unreacted HDI monomer was removed with a thin film evaporation apparatus. Table 1 shows the yield, a viscosity of the polyisocyanate composition thus obtained, a concentration of isocyanurate trimer, an allophanate bond number ratio a, a urethane bond number ratio c and a urethodione bond number ratio d.

Comparative Example 2

The air in a 4 neck flask equipped with a stirrer, a thermometer and a condenser was replaced with nitrogen, and 1000 g of HDI was added to the flask and while stirring at 60° C., 0.1 g of tetramethylammonium capriate as a catalyst and a monoalcohol was added at the same time under the conditions indicated in Table 1. Four hours later, the end of the reaction set by the refractive index measurement of the reaction mixture was checked and the reaction was terminated by adding 0.2 g of phosphoric acid. After filtering the reaction mixture, an unreacted HDI monomer was removed with a thin film evaporation apparatus.

Table 1 shows the type, quantity and yield of the monoalcohol used, a viscosity of the polyisocyanate composition thus obtained, a concentration of isocyanurate trimer, an allophanate bond number ratio a, a urethane bond number ratio c and a urethodione bond number ratio d.

Comparative Example 3

The air in a 4 neck flask equipped with a stirrer, a thermometer and a condenser was replaced with nitrogen, and 1000 g of HDI was added to the flask and while stirring at 80° C., 0.4 g of N,N,N-trimethyl-N-(2-hydroxypropyl)-ammonium.2-ethylhexanoate was added as a catalyst. One hour later, the end of the reaction set by the refractive index measurement of the reaction mixture was checked and the reaction was terminated by adding 0.2 g of phosphoric acid. Then 13.2 g of n-butanol was added to perform urethanization reaction for 2 hours.

After filtering the reaction mixture, an unreacted HDI monomer was removed with a thin film evaporation apparatus. Table 1 shows the conversion rate, a viscosity of the polyisocyanate composition thus obtained, a concentration of isocyanurate trimer, an allophanate bond number ratio a, a urethane bond number ratio c and a urethodione bond number ratio d.

TABLE 1

| | Monoalcohol | | Yield, mass % | Number average molecular weight | Concentration of isocyanate group, mass % | Average number of isocyanate group |
|---|---|---|---|---|---|---|
| | Type | Quantity g | | | | |
| Example 1 | isobutanol | 1.0 | 24 | 590 | 23.2 | 3.3 |
| Example 2 | isobutanol | 2.0 | 24 | 580 | 23.0 | 3.2 |
| Example 3 | 2-ethylhexanol | 3.0 | 24 | 570 | 22.9 | 3.1 |
| Example 4 | isobutanol | 1.0 | 25 | 570 | 22.8 | 3.1 |
| | 2-ethylhexanol | 5.0 | | | | |
| Comparative Example 1 | unused | | 20 | 600 | 23.4 | 3.3 |

TABLE 1-continued

| | | | | | | |
|---|---|---|---|---|---|---|
| Comparative Example 2 | 2-ethylhexanol | 30.0 | 23 | 570 | 21.9 | 3.0 |
| Comparative Example 3 | n-butanol | 13.2 | 31 | 600 | 21.1 | 3.0 |

| | Concentration of diisocyanate monomer, mass % | Viscosity of polyisocyanate mPa·s/25° C. | Concentration of isocyanulate trimer, mass % | Allophanate bond number ratio, a % | Urethane bond number ratio, c % | Urethodione bond number ratio, d % |
|---|---|---|---|---|---|---|
| Example 1 | 0.3 | 1300 | 68 | 2.7 | 0 | 0.3 |
| Example 3 | 0.3 | 1200 | 67 | 5.3 | 0 | 0.4 |
| Example 3 | 0.3 | 1000 | 67 | 5.7 | 0 | 0.3 |
| Example 4 | 0.3 | 800 | 67 | 12.4 | 0 | 0.3 |
| Comparative Example 1 | 0.3 | 1350 | 69 | 0 | 0 | 0.2 |
| Comparative Example 2 | 0.3 | 700 | 67 | 38.0 | 0 | 0.3 |
| Comparative Example 3 | 0.3 | 1240 | 62 | 0 | 24.4 | 0.3 |

TABLE 2

| | Result of evaluation on solubility in low polarity solvents | Result of evaluation on drying performance of coating | Concentration differences of diisocyanate monomer between before and after storing polyisocyanate composition |
|---|---|---|---|
| Example 1 | ○ | ○ | ○ |
| Example 2 | ○ | ○ | ○ |
| Example 3 | ○ | ○ | ○ |
| Example 4 | ○ | ○ | ○ |
| Comparative Example 1 | X | ○ | Δ |
| Comparative Example 2 | ○ | X | ○ |
| Comparative Example 3 | X | X | Δ |

INDUSTRIAL APPLICABILITY

The present invention provides a polyisocyanate composition having a low viscosity, good solubility in a low polarity solvent, and in which an increase of diisocyanate monomer concentration during storage is suppressed, and further, when used as a hardening agent for coatings, good coating physical properties in drying performance, weather resistance and the like are achieved.

The invention claimed is:

1. A polyisocyanate composition obtained by isocyanurate forming reaction, which is derived from an aliphatic diisocyanate monomer and 2-ethylhexanol and satisfies all of the following requirements when the composition contains substantially no aliphatic diisocyanate monomer and substantially no solvent:
   1) a viscosity at 25° C. is 800 to 1500 mPa·s,
   2) the concentration of isocyanurate timer is from 63 to 75 mass % in the polyisocyanate composition,
   3) an allophanate bond number, a=(A/(A+B))×100, is 1-4%, wherein A is an allophanate bond number in the polyisocyanate composition, and B is an isocyanurate bond number in the polyisocyanate composition, and
   4) a urethodione bond number, d=(D/(B+D))×100, is less than 2%, wherein D is a urethodione number in the polyisocyanate composition, and
   5) an isocyanate group concentration in the polyisocyanate composition is 22 to 25 mass %.

2. The polyisocyanate composition according to claim 1, wherein said aliphatic diisocyanate monomer is hexamethylene diisocyanate.

3. The polyisocyanate composition according to claim 1, or 2, obtained by using an ammonium compound as an isocyanurate forming reaction catalyst in an isocyanurate forming reaction of said aliphatic diisocyanate monomer.

4. A coating composition comprising the polyisocyanate composition according to claim 1 or 2.

5. A coating composition comprising the polyisocyanate composition according to claim 3.

* * * * *

UNITED STATES PATENT AND TRADEMARK OFFICE
CERTIFICATE OF CORRECTION

PATENT NO. : 8,952,120 B2
APPLICATION NO. : 11/992392
DATED : February 10, 2015
INVENTOR(S) : Yoshiyuki Asahina et al.

It is certified that error appears in the above-identified patent and that said Letters Patent is hereby corrected as shown below:

On the Title page, item [57]

Abstract, Line 11, "urethodione" should read as --uretdione--.

Abstract, Line 12, "urethodione" should read as --uretdione--.

In the Specification

Col. 2, Line 9, "urethodione" should read as --uretdione--.

Col. 2, Line 10, "urethodione" should read as --uretdione--.

Col. 3, Line 53, "urethodione" should read as --uretdione--.

Col. 3, Line 55, "urethodione" should read as --uretdione--.

Col. 5, Lines 1-2, "urethodione" should read as --uretdione--.

Col. 5, Line 3, "urethodione" should read as --uretdione--.

Col. 5, Line 9, "urethodione" should read as --uretdione--.

Col. 8, Line 38, "Urethodione" should read as --Uretdione--.

Col. 9, Line 30, "urethodione" should read as --uretdione--.

Col. 9, Line 48, "urethodione" should read as --uretdione--.

Col. 10, Line 12, "urethodione" should read as --uretdione--.

Col. 10, Line 32, "urethodione" should read as --uretdione--.

Signed and Sealed this
Thirtieth Day of June, 2015

Michelle K. Lee
*Director of the United States Patent and Trademark Office*

CERTIFICATE OF CORRECTION (continued)

U.S. Pat. No. 8,952,120 B2

Col. 10, Lines 40-41, "N,N,N-trimethyl-N-(2-hydroxypropyl)-ammonium.2-ethylhexanoate" should read as --N,N,N-trimethyl-N-(2-hydroxypropyl)-ammonium-2-ethylhexanoate--.

Col. 10, Line 52, "urethodione" should read as --uretdione--.

Col. 11-12, Table 1, "urethodione" should read as --uretdione--.

In the Claims

Claim 1, Col. 12, Line 34, "urethodione" should read as --uretdione--.

Claim 1, Col. 12, Line 35, "urethodione" should read as --uretdione--.